(12) United States Patent
Thomsen et al.

(10) Patent No.: US 11,907,937 B2
(45) Date of Patent: Feb. 20, 2024

(54) SPECIALTY APPLICATION ELECTRONIC EXCHANGE MITIGATION PLATFORM

(71) Applicant: BANK OF AMERICA CORPORATION, Charlotte, NC (US)

(72) Inventors: Kevin Patrick Thomsen, New York, NY (US); Ruchira Ghosh, Dallas, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 256 days.

(21) Appl. No.: 17/227,277

(22) Filed: Apr. 10, 2021

(65) Prior Publication Data
US 2022/0327521 A1    Oct. 13, 2022

(51) Int. Cl.
*G06Q 20/36* (2012.01)
*G06Q 20/40* (2012.01)

(52) U.S. Cl.
CPC ....... *G06Q 20/3676* (2013.01); *G06Q 20/401* (2013.01)

(58) Field of Classification Search
CPC .................. G06Q 20/3676; G06Q 20/401
USPC .......................................................... 705/68
See application file for complete search history.

(56) References Cited

U.S. PATENT DOCUMENTS

| | | | |
|---|---|---|---|
| 9,704,143 B2 | 7/2017 | Walker et al. | |
| 9,892,460 B1 | 2/2018 | Winklevoss et al. | |
| 9,898,782 B1 | 2/2018 | Winklevoss et al. | |
| 9,965,805 B1 | 5/2018 | Winklevoss et al. | |
| 10,002,389 B1 | 6/2018 | Winklevoss et al. | |
| 10,171,245 B2 | 1/2019 | Wilkins et al. | |
| 2004/0177035 A1 | 9/2004 | Silva | |
| 2007/0061254 A1 | 3/2007 | Blunck et al. | |
| 2015/0332224 A1 | 11/2015 | Melika et al. | |
| 2015/0332395 A1 | 11/2015 | Walker et al. | |
| 2015/0363768 A1 | 12/2015 | Melika et al. | |
| 2015/0363777 A1 | 12/2015 | Ronca et al. | |
| 2016/0071108 A1 | 3/2016 | Caldera et al. | |
| 2017/0132635 A1* | 5/2017 | Caldera | G06Q 20/381 |
| 2017/0213221 A1 | 7/2017 | Kurian et al. | |
| 2017/0243289 A1 | 8/2017 | Rufo | |
| 2018/0189789 A1* | 7/2018 | Caldera | G06Q 20/381 |
| 2018/0240191 A1 | 8/2018 | Aronson | |
| 2018/0365773 A1* | 12/2018 | Han | G06Q 10/0635 |
| 2018/0374152 A1* | 12/2018 | Dominguez | G06Q 20/4016 |
| 2019/0006620 A1 | 1/2019 | Kim et al. | |
| 2019/0066206 A1 | 2/2019 | Marks | |
| 2019/0095995 A1 | 3/2019 | Rohlfs | |

(Continued)

*Primary Examiner* — Courtney P Jones
(74) *Attorney, Agent, or Firm* — Moore & Van Allen PLLC; Nicholas C. Russell

(57) ABSTRACT

Embodiments of the invention are directed to a system, method, or computer program product for probing and identifying unique transaction characteristics associated with digital resource exchange platforms. The system identifies the unique characteristics and stores them as digital resource exchange identifiers capable of being cross-referenced with real-time or stored transaction data from multiple transaction channels in order to intelligently identify transactions involving one or more entity resource accounts and digital resource exchanges. Various decisioning steps are described which may be automated following the identification of a transaction or entity resource account involving one or more digital resource exchanges.

20 Claims, 5 Drawing Sheets

(56) References Cited

U.S. PATENT DOCUMENTS

| | | |
|---|---|---|
| 2019/0220856 A1 | 7/2019 | Li et al. |
| 2020/0184479 A1* | 6/2020 | Benkreira .......... G06Q 20/0658 |
| 2020/0402061 A1 | 12/2020 | Ludwig et al. |
| 2021/0027298 A1* | 1/2021 | Jung .................. G06Q 20/3224 |
| 2021/0056520 A1 | 2/2021 | Thomsen et al. |
| 2021/0192541 A1* | 6/2021 | Black ..................... G06Q 40/04 |
| 2021/0357915 A1* | 11/2021 | Makrides ........... G06Q 20/3674 |
| 2022/0020026 A1* | 1/2022 | Wadhwa ................ G06N 3/088 |

* cited by examiner

SPECIALTY APPLICATION ELECTRONIC EXCHANGE MITIGATION PLATFORM

FIELD

The present invention generally relates to a system for secure resource distribution utilizing multiple resource transaction channels.

BACKGROUND

With the advent of digital resource exchanges, a gap has may be created with regard to visibility into resource distributions across entity accounts and between entity accounts and third party accounts. Typically, the digital resource exchange may determine text used in a description field of a resource transaction between an entity account and the digital resource exchange. In some instances, the digital resource exchange may choose not to self-identify as a resource exchange. As such, entities may face certain challenges in anticipating and thwarting misappropriation of resources if resource transactions are not appropriately identified and categorized. A need exists for tracking and mitigating the visibility gap that arises between entity accounts and accounts of digital resource exchange networks.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address these and/or other needs by providing an innovative system, method, and computer program product for an electronic exchange identification and visibility platform.

The advent of digital resource exchanges has created a gap in entity, specific financial institution entities, visibility of resource distributions across financial institution accounts to a digital resource exchange. The digital resource determines the text used in the transaction description field of the transaction and if the exchange does not self-identify as a digital resource exchange, then entity is blind to the transaction type and whether it involves digital resources, such as cryptocurrencies. The gap created by this blindness may reduce an entity or financial institution's ability to comply with its own guidelines or those promulgated by outside entities, and may have the unfortunate effect of increasing probability of loss or exposure to potential loss arising from potential misappropriation activities. Typically, digital resource exchanges that are preforming non-conforming activities do not self-declare as a digital resource exchange, but instead declare as an on-line retailer, for example. Thus, financial institutions cannot identify the non-conforming activity and accounts associated therewith. When there is no identifier information in the payment description that the transaction involves a digital resource, there is a gap. As such, a need exists to close this gap and provide a system to identify the exchanges and the accounts associated therewith.

The proposed system described herein includes various systems and methods for identifying digital exchanges, storing associated identifying data, recognizing transactions including digital resources exchanges as a party, and taking action to thwart the use of digital resource exchanges for unauthorized or malfeasant purposes. In some embodiments, if a particular resource account is identified as transacting or attempting to transact with a digital resource exchange, certain actions may be taken to reduce or stop account activity for the particular resource account in question. In some embodiments, only certain accounts may be restricted from interacting with digital resource exchanges. In other embodiments, all accounts may be restricted from interacting with one or more digital resource exchanges. For instance, if the system determines a resource account has attempted to access a digital resource exchange, or initiate a resource transaction involving one or more digital resource exchanges, the system may automatically freeze or lock the particular resource account from any further use until further review can be completed. In doing so, the system may proactively thwart the use of the resource account in other potentially malfeasant manners. For instance, if an unauthorized party attempts to use a compromised account to transfer funds to one or more digital resource exchanges unsuccessfully, the unauthorized party may attempt one or more alternate avenues to extract resources from the resource account (e.g., the unauthorized party may attempt an automated teller machine (ATM) withdrawal, or the like). As such, it is beneficial to place an automatic freeze or lock on the account until a further investigation into the unauthorized account activity can take place.

Additionally, once certain information has been collected or deduced which enhances a financial institution's ability to identify digital resource exchanges as parties to resource transactions, the financial institution may wish to employ various restrictions or monitoring techniques in order to further its ability to thwart malfeasant behavior and potential loss. For instance, if the financial institution determines or identifies that a pattern of malfeasant activity is occurring related to a particular account, exchange, or the like, the financial institution may escalate transactions from or between those accounts or entities for further review or investigation. Furthermore, in some embodiments, financial institutions may provide transaction, settlement, or account management services to customers or third parties which desire to limit particular transaction types involving digital resource exchanges. Accurately identifying digital resource exchanges allows the financial institution to maintain a high degree of confidence in instituting limitations which are narrowly tailored to achieve desired results.

In some embodiments, the process identifies and categorizes accounts and exchanges associated with potential misappropriation. In some embodiments, the invention may utilize entity systems and servers to perform portions of the process. The system may be utilized to establish an account or wallet on one or more digital resource exchanges. Once the system has set up a wallet or account with the digital resource exchange, the system may fund the digital resource account with entity or financial institution funds for each possible payment channel, such as wire, ACH, debit, real-time payment, and/or credit and/or other fiat currency payment channels. Once a transaction occurs via the exchange, the system may be able to perform back end searching to look up the resource distribution. In doing so, the system identifies the resource account associated with the digital resource exchange. The system tags the account and the exchange and stores the tagged information to maintain an inventory of digital resource exchanges and the account used to support the exchanges. The system may be leveraged as a valuable data source. For instance, once the account or unique transaction characteristics associated with one or more digital resource exchanges have been identified, this data may cross referenced with other transaction data in order to identify and categorize entity-side accounts transacting with the digital resource exchanges. Particular digital resource exchanges may be known or uncovered as being associated with potential for resource loss. In other instance, certain misappropriation plans or patterns may be uncovered which utilize transactions with certain digital resource exchanges most frequently. Based on this knowledge, the system may effectively and efficiently flag transactions and accounts for further review.

Embodiments of the invention relate to systems, methods, and computer program products for identifying a digital resource exchange; accessing an onboarding platform of the digital resource exchange and create an entity controlled presence on the digital resource exchange, wherein the entity controlled presence includes a digital resource account or digital resource wallet; funding the entity controlled presence on the digital resource exchange with resources from an account associated with the entity, wherein the funding occurs for one or more available payment channels offered by the digital resource exchange; reversing the funding from the entity controlled presence on the digital resource exchange to the account associated with the entity for each of the one or more available transaction channels; extracting, via an entity-based backend processor, information about the digital resource exchange based on the funding and reversing performed, an appearance of the onboarding platform, or one or more services or digital resources supported by the digital resource exchange; storing the extracted information as one or more digital resource exchange identifiers; for receiving transaction data and transaction metadata for one or more entity user resource accounts; cross referencing the transaction data or transaction metadata with the digital resource exchange identifiers; based on a match between the transaction data or transaction metadata and the digital resource exchange identifiers, tagging the one or more entity user resource accounts or specific transactions of the one or more entity user resource accounts as transacting with the digital resource exchange; and based on tagged entity user resource accounts or tagged specific transactions, initiating a decisioning step for transactions between the one or more entity user resource accounts and the digital resource exchange.

In some embodiments, the decisioning step further comprises declining, holding, or accepting transactions between the one or more entity user resource accounts and the digital resource exchange.

In some embodiments, the invention further comprises identifying an entity resource account type of the one or more entity user resource accounts, wherein the entity resource account type includes one or more transaction restrictions.

In some embodiments, the digital resource exchange identifiers further comprise one or more account numbers, wallet addresses, geographic locations, or transaction details.

In some embodiments, the invention further comprises weighting digital resource exchange identifiers based on digital resources supported by the exchange or information collected by the digital resource exchange during an onboarding process.

In some embodiments, the invention further comprises: flagging one or more accounts, wallets, or exchanges based on entity-based or customer based restrictions; and automatically blocking one or more tagged transactions associated with the one or more accounts, wallets, or exchanges.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
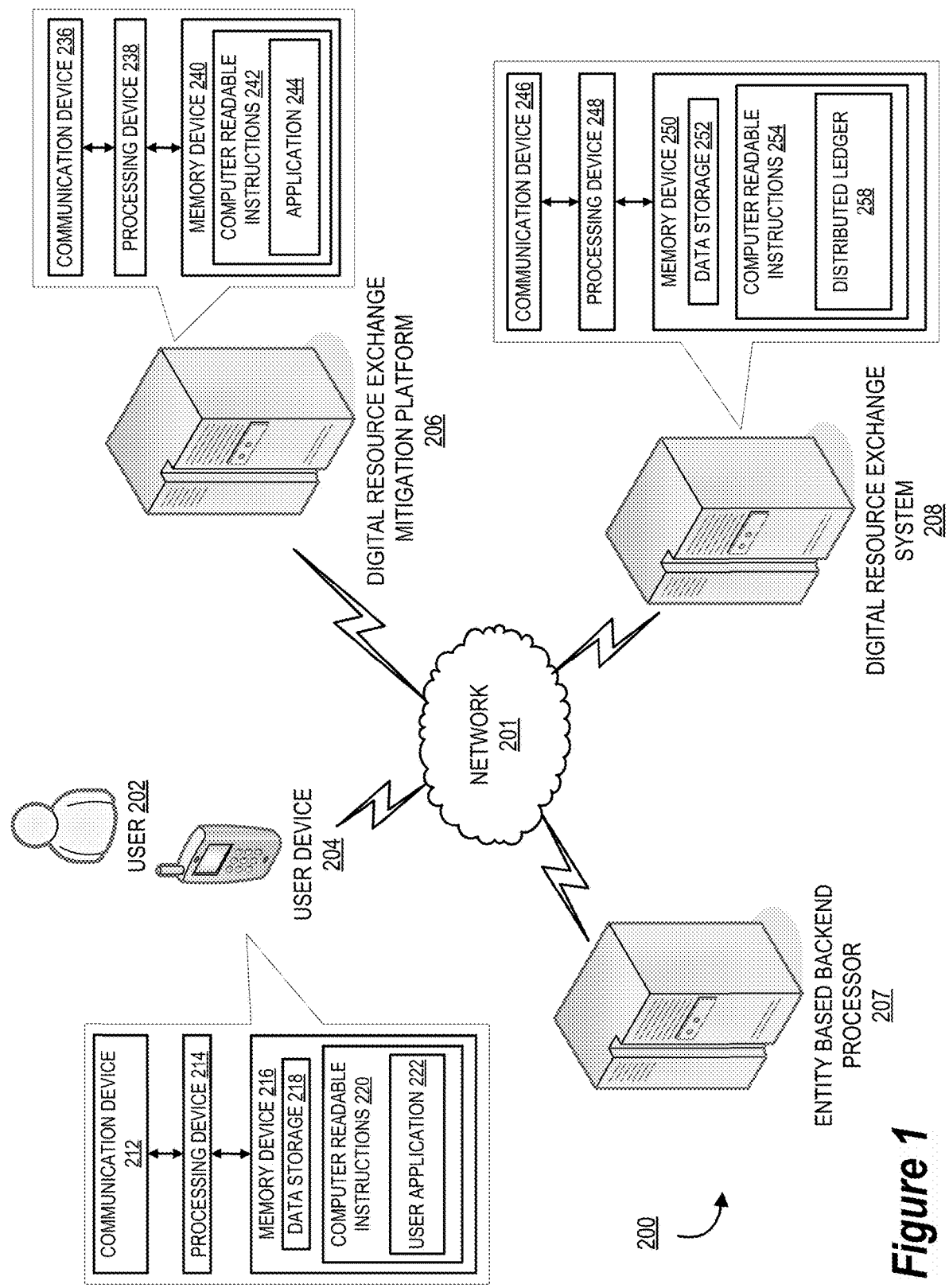
Figure 2:
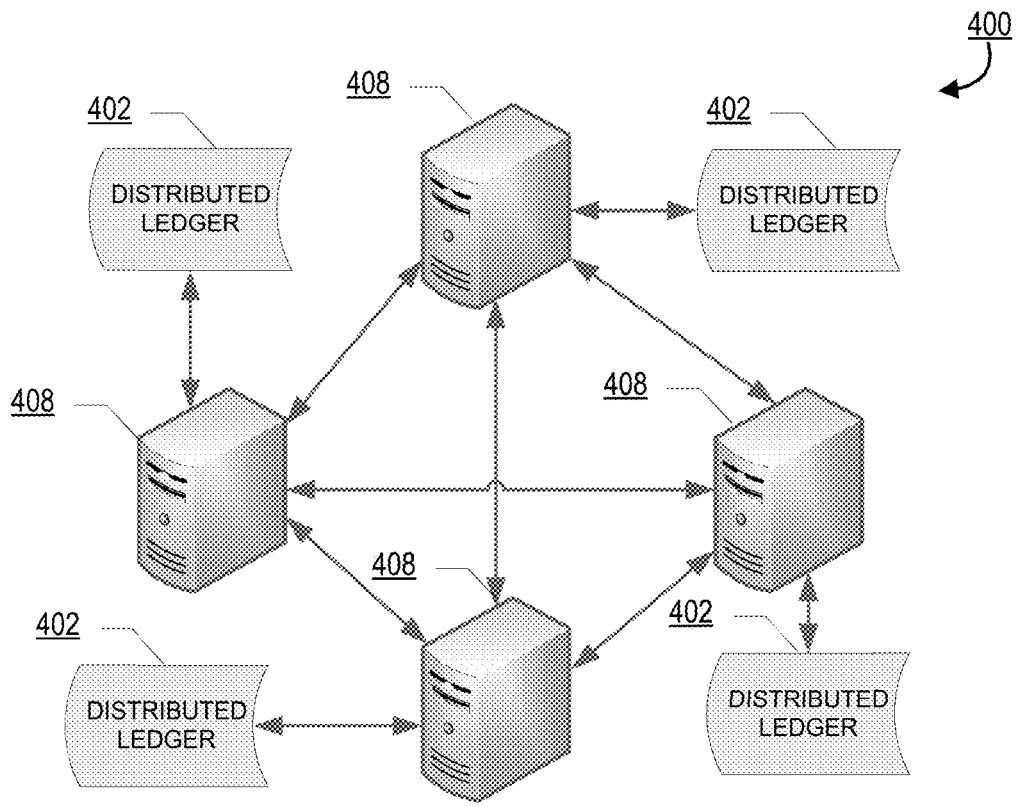
Figure 3:
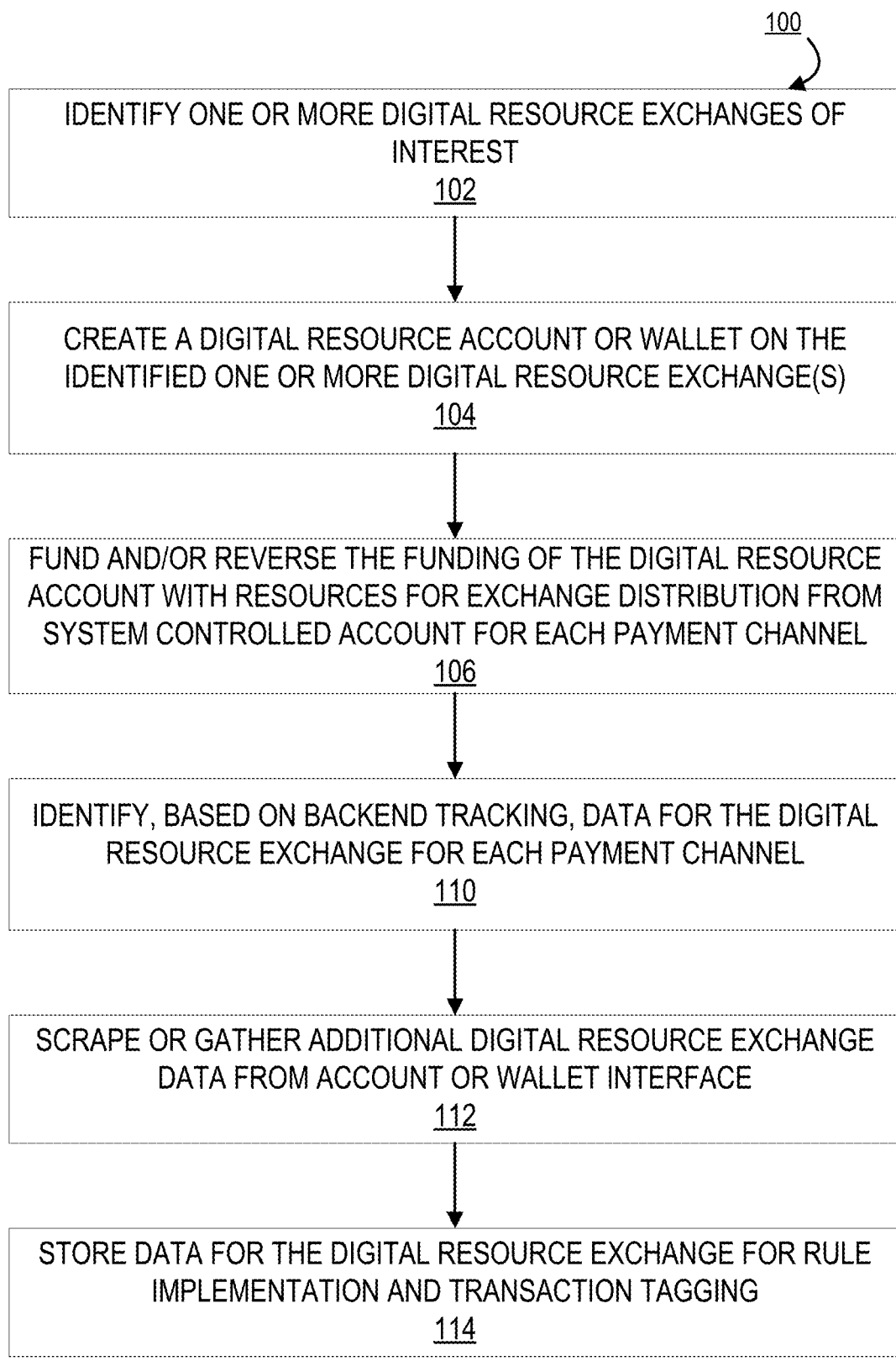
Figure 4:
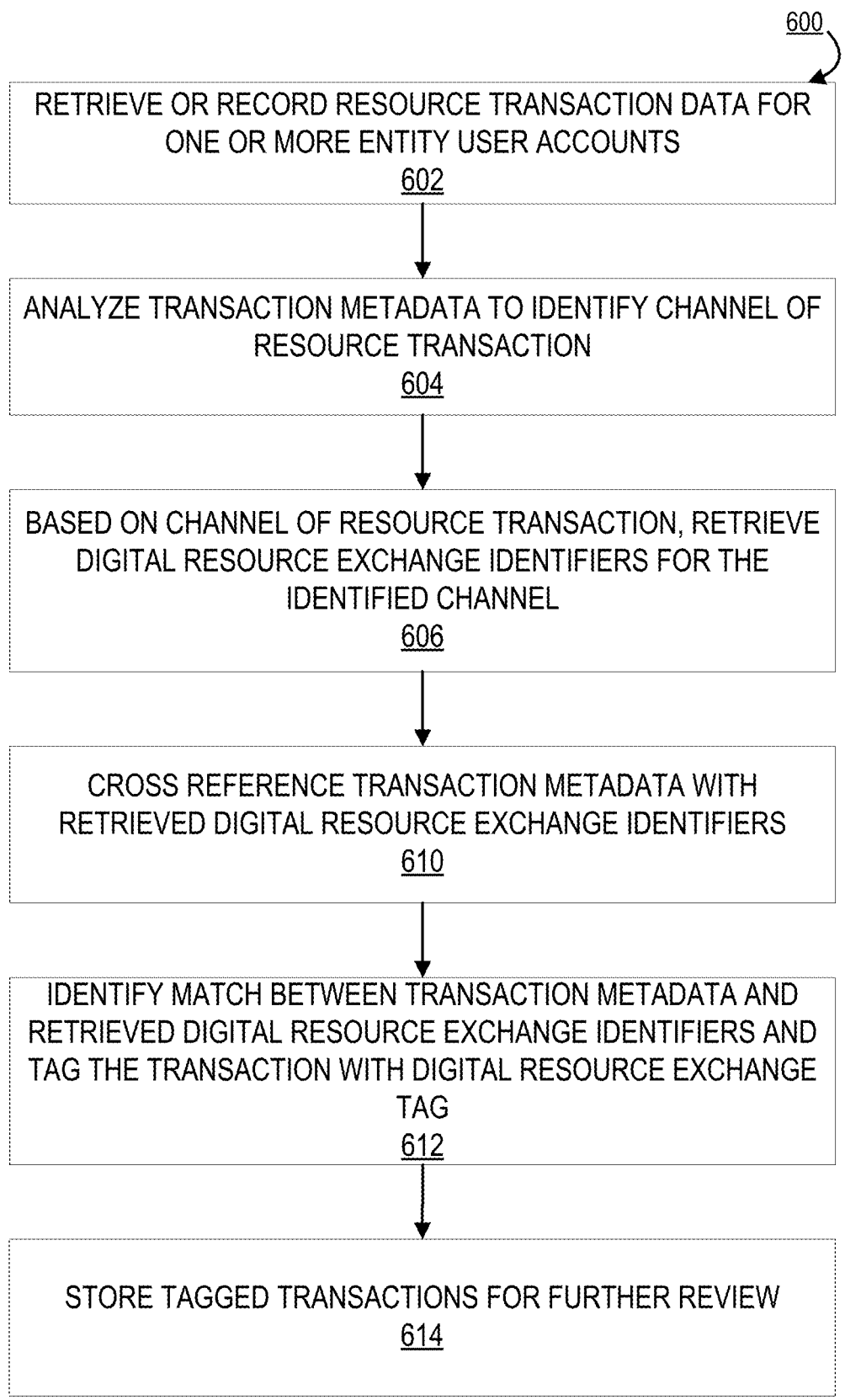
Figure 5:
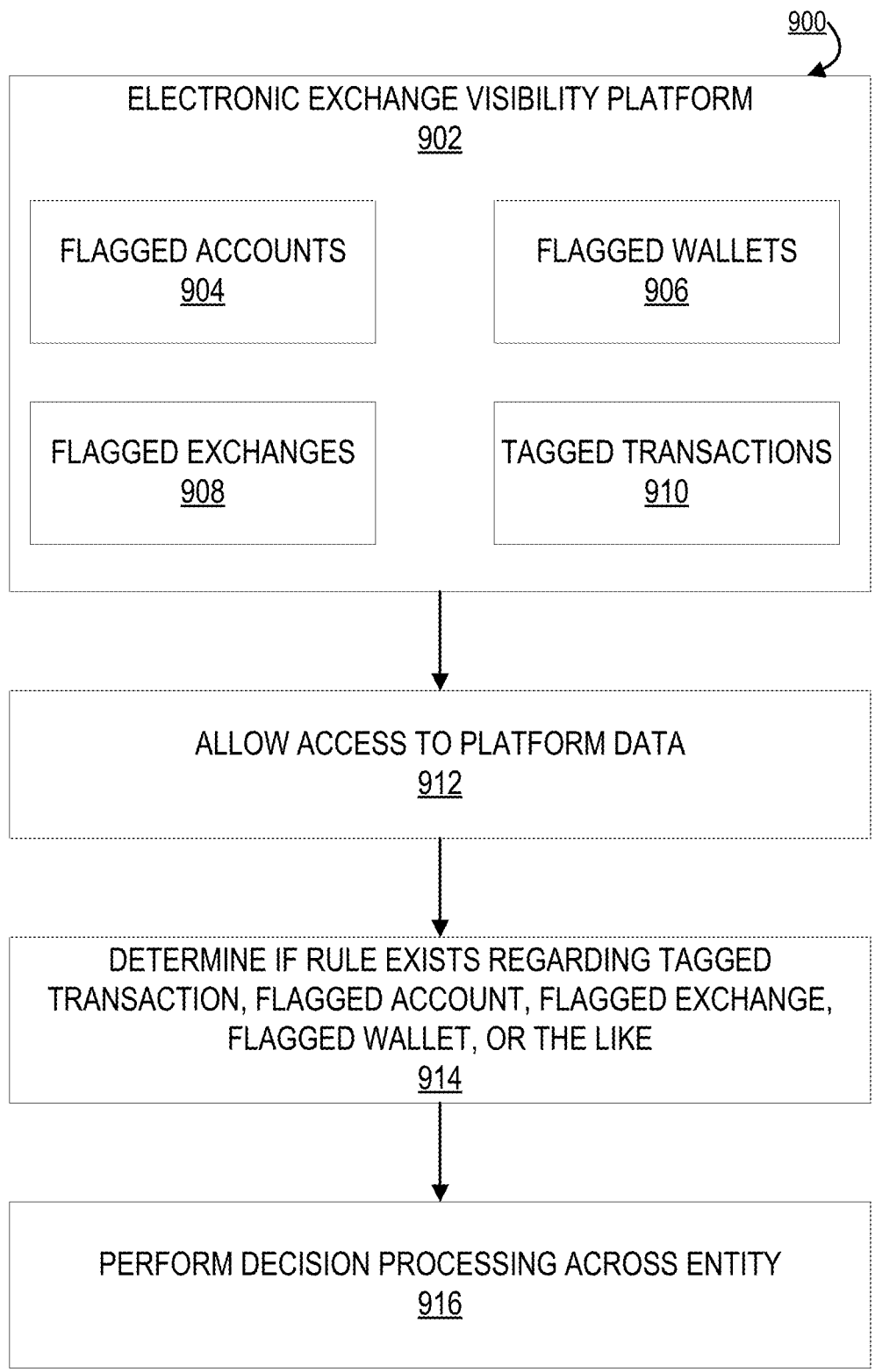

Having thus described embodiments of the invention in general terms, reference will now be made to the accompanying drawings, wherein:

FIG. 1 provides a digital resource exchange mitigation platform environment, in accordance with one embodiment of the present invention;

FIG. 2 provides a block chain system environment architecture 400, in accordance with one embodiment of the present invention;

FIG. 3 provides a high level process flow 100 illustrating an identification and categorization of digital resource identifiers, in accordance with one embodiment of the present invention;

FIG. 4 provides a high level process flow 600 illustrating an identification and tagging of transactions with a digital resource exchange, in accordance with one embodiment of the present invention; and FIG. 5 provides a high level process flow 900 illustrating action steps in response to analysis of tagged transactions, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

A "user" as used herein may refer to an individual that may have one or more accounts associated with the individual. Furthermore, as used herein the term "user device" or "mobile device" may refer to mobile phones, personal computing devices, tablet computers, wearable devices, and/or any portable electronic device capable of receiving and/or storing data therein.

An "account" is the relationship that a user has with an entity or another entity, such as a financial institution. Examples of accounts include a deposit account, such as a transactional account (e.g., a banking account), a savings account, an investment account, a money market account, a time deposit, a demand deposit, a pre-paid account, a credit account, a non-monetary user datastore that includes information associated with the user, or the like. The account is associated with and/or maintained by the entity. "Resources" include accounts of the user and/or other property owned by the user. The resources may be associated with accounts or may be property that is not associated with a specific account. Examples of resources associated with accounts may be accounts that have cash or cash equivalents, or accounts that are funded with or contain property, such as safety deposit box account, a trust account that is funded with property, or the like. Examples of resources that may not be associated with accounts may be antiques in a user's home, jewelry in a user's home, or the like. "Funds" or "Available Balance" are a balance in an account that can be invested or withdrawn. For example, the funds may refer to a bank ledger balance minus the amount of any monetary checks in the process of collection. Funds may also be referred to as an available balance, a collected balance, good funds, and usable funds.

A "transaction" or "resource distribution" refers to any communication between a user and the financial institution or other entity monitoring the user's activities. Alternatively, in some embodiments, the term "transaction" may be used when describing the block chain database as a transaction type of record. The transaction type records consists of the actual data stored in the block chain. A transaction may refer to a purchase of goods or services, a return of goods or services, a payment transaction, a credit transaction, or other interaction involving a user's account. In the context of a financial institution, a transaction may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that is detectable by the financial institution. A transaction may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like.

In some embodiments, the term digital resource exchange or exchange refers to one or more cryptocurrency exchanges on a network. In some embodiments, the term digital resource or virtual resource refers to cryptocurrency or a cryptocurrency digital resource account or wallet used to perform transactions across a digital resource exchange. In some embodiments, the term digital misappropriation refers to misappropriation, cyber misappropriation, or actions outside of regulatory and/or policy compliance, or the like. In further embodiments, one or more digital resource exchanges may provide virtual resources, digital resources, cryptocurrencies, or the like to one or more customers or users of the digital resource exchange. In other embodiments, the digital resource exchange may manage or host one or more digital wallets for storage of digital resources for one or more users. In other embodiments, digital resource exchanges be used to trade, swap, leverage, stake, collateralize, or the like, a first digital resource in a denomination based on a second digital resource or fiat currency. The terms digital resource exchange, electronic resource exchange, or virtual resource service provider may be used interchangeably.

In some embodiments, the term digital resource account or wallet may refer to any of one or more digital resource wallet, mobile wallet, or digital resource platform that may connect with or be associated with a digital resource exchange for the exchange of resources across the digital resource exchange.

The advent of digital resource exchanges has created a gap in entity, specific financial institution entities, visibility into resource distributions to and from digital resource exchanges. In embodiments where a financial institution or entity is a party to a transaction with a digital resource exchange, the digital resource exchange itself may determine certain text to be included in the transaction description field of the transaction. As such, if the digital resource exchange does not self-identify as a digital resource exchange, then financial institution or entity will need to look to other sources of information to deduce whether or not the transaction type involves a digital resource exchange or digital resources themselves (e.g., transferring resources to a digital resource exchange for later trading, swapping, leveraging, or the like, or using resources to directly buy digital resources, virtual currencies, cryptocurrencies, tokens, nonfungible tokens, or the like). The gap created by this blindness puts financial institutions and other entities in the precarious situation of being unable to efficiently and accurately identify resource accounts involved in potential misappropriation activities. It is common for digital resource exchanges that are assisting or enabling malfeasant financial activities to avoid self-declaring as a digital resource exchange, but instead declare as an on-line retailer. Thus, financial institutions cannot even begin the first step of a potential malfeasant activity investigation.

It is understood that while not all digital resource exchanges or digital resource transactions are malfeasant, and indeed a large majority may be legitimate, lack of due diligence by some digital resource exchanges, such as failure to collect personal information when setting up accounts or wallets, failure to maintain records of transactions between wallets and users, or the like, creates an opportunity for users to leverage these failures in order to move resources for potentially malfeasant purposes, in some instances without leaving any meaningful or identifiable data footprint. In certain instances, the digital resources themselves, or their underlying distributed registers or decentralized blockchains, may be designed particularly to offer anonymity (e.g., "privacy coins," or the like). In instances where certain anonymized or privacy-centric digital resources are only accessible via a select few exchanges, those exchanges may act as popular off-ramps, on ramps, resource scramblers, or funnels for misappropriated resources. There is typically nothing that identifies the digital resource exchange as such across the payment flow. As such, a need exists to gather necessary information in order to remedy the information gap presented by lack of self-identification in transactions involving certain digital resource exchanges in order to provide a system that may leverage this data in a layered analysis of resource accounts to enhance the ability to perform pattern analysis and identify malfeasant activity. It is understood that embodiments of the invention may not focus solely on the identification of digital resource exchanges or digital resources as a determining factor or proximate cause of malfeasant activity, but given that certain malfeasant resource behavior often includes the use of digital resource exchanges, gathering such information allows financial institutions and entities to make more informed, precise decisions.

The system is utilized to identify and tag accounts and exchanges associated with potential digital misappropriation. As such, this may include the integral step of identifying the accounts supporting digital resource exchanges and using this identified information to determine that one or more transactions involve a digital resource exchange as a party. As an initial step in identifying accounts supporting digital resource exchanges, the system may set up an account, such as a digital resource account or wallet, on one or more exchanges. The system then funds the digital resource account or wallet with entity or financial institution funds, wherein the funding step is a resource transaction with the digital resource exchange. Once the transaction occurs with the exchange, the system may record, retrieve, or otherwise look up the resource distribution pathway or metadata associated with the transaction across one or more multiple resource transaction rails. The system may identify a unique payment identifier, account number, routing number, wallet address, or the like, associated with the digital resource exchange, collectively referred to as digital resource exchange identifiers. The system tags the digital resource exchange identifiers with the name of the digital resource exchange, categorizes the tags in various ways based on resource transaction rail, exchange name, exchange location, or the like, and stores the tagged information to maintain an inventory of digital resource exchanges and the various identifiers of the exchanges. As such, the system may be utilized as intelligence source to identify accounts transacting with the digital resource exchanges so the resource accounts can be flagged for further review. In other embodiments, the identification of accounts transacting with the digital resource exchanges may be one of multiple weighted factors in determining if the account will be flagged for further review. In still further embodiments, the identification of the account transacting with the digital resource exchange may be weighted variably based on the volume, frequency, resource amount, or the like regarding transactions with the digital resource exchange. In some instances, an abrupt change in the volume frequency, resource amount, or the like with regard to transactions with one or more digital resource exchanges may cause the system to weight this factor more heavily. In other embodiments, certain digital resource exchange known to be involved with malfeasant resource transactions, known as failing to collect personal information, or the like, may cause the system to more heavily weight factors that include tags related to those certain digital resource exchanges.

FIG. 1 provides a digital resource exchange mitigation platform environment, in accordance with one embodiment of the present invention. FIG. 1 provides the system environment 200 illustrating various system components and channels of communication for sharing information and sharing analytics. FIG. 1 provides a unique system that includes specialized servers and system communicably linked across a distributive network of nodes required to perform the functions disclosed herein.

As illustrated in FIG. 1, the digital resource exchange mitigation platform 206 can extract information from the user device 204 and digital resource exchange system 208. FIG. 1 illustrates only one example of an embodiment of the system environment 200, and it will be appreciated that in other embodiments one or more of the systems, devices, or servers may be combined into a single system, device, or server, or be made up of multiple systems, devices, or servers.

The entity based backend processor 207 may identify information about the digital resource exchange based on the funding, transactions, and potential reversal of transactions (e.g., sending resource from the digital resource exchange back to the financial institution or entity). The information which the entity based backend processor 207 may extract comprises information about the digital resource exchange, including, but not limited to, identifying information such as digital resource exchange name, account number(s), routing number(s), wallet address or addresses, geographic location, or digital resources, virtual currencies, exchange products (e.g., interest bearing deposits, leverage trading, perpetual contracts, options, staking services, resource swapping options, or the like), offered by the digital resource exchange, or the like, and may store this information as digital resource exchange identifiers for later use in tagging processes. In some embodiments, once the entity based backend processor 207 has deposited resources to the digital resource exchange and set up an account or wallet with the exchange, the entity based backend processor 207 may conduct one or more probative actions using the account or wallet in order to determine potential for anonymized resource handling (e.g., buying/selling privacy coins, scrambling resources, swapping resources, or the like). In addition, during the account or wallet setup or initial onboarding with the digital resource exchange, the entity based backend processor 207 may record or otherwise keep track of what information is collected by the digital resource exchange pertaining to new users or customers in order to determine if the digital resource exchange complies with industry best-practices. In some embodiments, the entity based backend processor 207 may also make a determination as to perceived liquidity of the digital resource exchange. For instance, if there is an extreme delay in withdrawing funds, or the like, this may indicate that the exchange does not have necessary liquidity to process all incoming withdrawal requests and that this poses a potential for resource loss or malfeasant behavior; however, it is noted that certain delays related to settlement of initially deposited resources to the digital resource exchange account or wallet may be standard and expected, depending on the type of resources deposited (e.g., a period of days may be required to confirm an ACH transfer of fiat currency, whereas a similar delay would not be expected for some digital currencies which are quickly or instantly settled in a distributed fashion).

The network 201 may be a system specific distributive network receiving and distributing specific network feeds and identifying specific network associated triggers. The network 201 may also be a global area network (GAN), such as the Internet, a wide area network (WAN), a local area network (LAN), or any other type of network or combination of networks. The network 201 may provide for wireline, wireless, or a combination wireline and wireless communication between devices on the network 201.

In some embodiments, the user 202 is an individual that has one or more digital resource accounts. In some embodiments, the user 202 has a user device, such as a mobile phone, tablet, computer, or the like. FIG. 1 also illustrates a user device 204. The user device 204 may be, for example, a desktop personal computer, a mobile system, such as a cellular phone, smart phone, personal data assistant (PDA), laptop, or the like. In some embodiments, the user device 204 may store an encrypted file, private keys, public keys, or the like associated with one or more digital resource wallets. In other embodiments, the user device 204 may be an encrypted storage device for storing private keys to one or more digital resource wallets and allowing the user to initiate or authenticate one or more transactions, such as a hardware wallet, cold wallet, or the like. The user device 204 generally comprises a communication device 212, a processing device 214, and a memory device 216. The processing device 214 is operatively coupled to the communication device 212 and the memory device 216. The processing device 214 uses the communication device 212 to communicate with the network 201 and other devices on the network 201, such as, but not limited to the digital resource exchange mitigation platform 206 and the digital resource exchange system 208. As such, the communication device 212 generally comprises a modem, server, or other device for communicating with other devices on the network 201. In some cases, one or more user devices 204 may be used in conjunction in order to communicate with the entity based backend processor 207, digital resource exchange system 206, or digital resource exchange mitigation platform 206. For example, the user device may be used to inmate one or more resource transactions, gather information from the various system components, or configure one or more parameters of the system components in an administrative capacity (e.g., rules, weighting factors, thresholds, or the like). The user device 204 comprises computer-readable instructions 220 and data storage 218 stored in the memory device 216, which in one embodiment includes the computer-readable instructions 220 of a user application 222. In some embodiments, the user application 222 allows a user 202 to initiate a resource transaction.

As further illustrated in FIG. 1, the digital resource exchange system 208 is a system that runs, monitors, hosts, or otherwise controls a digital resource exchange. The digital resource exchange system 208 is typically operatively connected to one or more blockchain-based or decentralized distributed networks. The digital resource exchange 208 may also host or control one or more servers, web applications, or the like, for storage of user account information, for storage of user wallet information, for custody of digital resources, or the like. The digital resource exchange system 208 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201, such as, but not limited to the digital resource exchange mitigation platform 206 and the user device 204. As such, the communication device 246 generally comprises a modem, server, or other device for communicating with other devices on the network 201.

As further illustrated in FIG. 1, the digital resource exchange system 208 comprises computer-readable instructions 254 stored in the memory device 250, which in one embodiment includes the computer-readable instructions 254 of the distributed ledger 258. In some embodiments, the memory device 250 includes data storage 252 for storing data related to transactions and payments across the digital resource exchange hosted by the digital resource exchange system 208, but not limited to data created and/or used by the distributed ledger 258.

Embodiments of the digital resource exchange system 208 may include multiple systems, servers, computers, or the like maintained by one or many entities. FIG. 1 merely illustrates one of those systems that, typically, interacts with many other similar systems to form the block chain for the digital resource exchange network. In one embodiment of the invention, the digital resource exchange system 208 is operated by a second entity that is a different or separate entity from the digital resource exchange mitigation platform 206 or one or more block chains.

In one embodiment of the digital resource exchange system 208 the memory device 250 stores, but is not limited to a distributed ledger 258. In one embodiment of the invention, distributed ledger 258 may associate with applications having computer-executable program code that instructs the processing device 248 to operate the network communication device 246 to perform certain communication functions involving described herein to create a digital resource exchange network for performing digital resource exchanges or transactions. In one embodiment, the computer-executable program code of an application associated with the distributed ledger 258 may also instruct the processing device 248 to perform certain logic, data processing, and data storing functions of the application.

The processing device 248 is configured to use the communication device 246 to gather data, such as data corresponding to transactions, blocks, or other updates to the distributed ledger from various data sources such as other block chain network systems across the digital resource exchange. The processing device 248 stores the data that it receives in its copy of the distributed ledger stored in the memory device 250.

As illustrated in FIG. 1, the digital resource exchange mitigation platform 206 generally comprises a communication device 236, a processing device 238, and a memory device 240. The digital resource exchange mitigation platform 206 comprises computer-readable instructions 242 stored in the memory device 240, which in one embodiment includes the computer-readable instructions 242 of an institution application 244. The digital resource exchange mitigation platform 206 may generate accounts on the digital resource exchange system 208 and log information throughout the account set-up or onboarding process, or in transacting with the account of the digital resource exchange system 208 to uncover digital resource exchange identifiers. Furthermore, the digital resource exchange mitigation platform 206 may monitor and consume digital resource transaction data from publicly accessible blockchain distributed ledgers to identify potential digital resource exchange systems 208. For instance, given the public, decentralized nature of block chain or distributed register systems, once a wallet address is identified as being associated with the digital resource exchange system 208, the digital resource exchange mitigation platform 206 or entity based backend processer 207 may monitor activity which includes the wallet address of the digital resource exchange system 208 in order to gain insight on the types of, frequency of, volumes of, or parties to transactions of digital resources with the digital resource exchange system 208.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 2 provides a block chain system environment architecture 400, in accordance with one embodiment of the present invention. Rather than utilizing a centralized database of data for instrument conversion, various embodiments of the invention may use a decentralized block chain configuration or architecture of nodes 408 as shown in FIG. 2. The block chain system typically has two primary types of records. The first type is the transaction type, which consists of the actual data stored in the block chain. The second type is the block type, which are records that confirm when and in what sequence certain transactions became recorded as part of the block chain. Transactions are initiated or authenticated for initiation by participants who submit transaction data using the block chain for broadcasting to various ledger nodes 408 of the block chain for transaction verification, confirmation, or validation. A "valid" transaction is one that can be validated or confirmed based on a set of rules that are defined by the particular system implementing the block chain. For example, in the case of cryptocurrencies, a valid transaction is one that is digitally signed, spent from a valid digital wallet and, in some cases that meets other criteria, such as being confirmed a number of times via a consensus of disparate nodes 408 of the block chain. In some block chain systems, miner nodes 408 are encouraged validate or confirm transactions to create blocks by nature of a block reward structure that offers a predefined per-block reward and/or tokens or resources distributed to the miners within the transactions validated themselves. Thus, when a miner successfully validates a transaction on the block chain, the miner may receive rewards or the like as an encouragement to continue creating new blocks and validating transactions.

In some embodiments, in order to prevent a double-spend scenario where the same identical digital resources are sent to two separate wallets, transactions are produced along with a unique hash value which contains a certain level of cryptographic difficulty to confirm by the nodes 408 (e.g., a proof of work algorithm). In such scenarios, the "work" put in by the mining system of a node is the computing power required to verify one or more transactions and earn a block reward. In other embodiments, nodes may instead be encouraged to validate transactions accurately based on a certain amount of digital resources "staked" or put up as collateral against the veracity of the node output (e.g., a proof of stake algorithm). If a node 408 incorrectly validates a transaction which is later rejected by a consensus of other nodes, the node 408 may lose a portion of the staked value of digital resources. If a node 408 correctly validates a transaction which is later confirmed by a consensus of other nodes, the node 408 may earn a reward. In some embodiments, nodes which are not participating on a consistent basis may lose a portion of their staked value. In other embodiments, a threshold of incorrectly validated transactions or period of node downtime may cause the node 408 to be removed from the block chain system 400 and forfeit all or a portion of the staked digital resources.

As mentioned above and referring to FIG. 2, a block chain system 400 is typically decentralized, meaning that a distributed ledger 402 (i.e., a decentralized ledger) is maintained on multiple nodes 408 of the block chain system 400. One node in the block chain may have a complete or partial copy of the entire ledger or set of transactions and/or blocks on the block chain. Transactions are initiated at a node of a block chain and communicated to the various nodes of the block chain. Any of the nodes can validate a transaction, add the transaction to its copy of the block chain, and/or broadcast the transaction, its validation (in the form of a block) and/or other data to other nodes. This other data may include time-stamping, such as is used in cryptocurrency block chains in order to delineate the chain of blocks which are linked in a successive, immutable order once confirmed by a consensus of nodes 408.

It is understood that the digital resource exchange system 208 may either participate in the blockchain system 400 as a node, or may simply interact with one or more block chain systems 400 in order to submit transactions for verification and retrieve transaction history from the distributed ledger 402. In some embodiments, the digital resource exchange system 208 may operate off-chain as a marketplace for digital resources wherein the digital resources are traded instantly and the value of digital resources, denominated in one or more trading pairs versus other digital resources of traditional fiat resources fluctuates based on supply and demand of available order books (e.g., users of the digital resource exchange system 208 may place market orders, limit orders, stop-limit orders, or the like which may be added to order books of the exchange in real time as orders are pending, filled, submitted, canceled, or the like). As such, digital resource exchanges 208 may settle a large volume of resource "trades" or transactions on paper of the exchange books before settling or submitting bulk transactions of the underlying block chain system 400 of each digital resource. In some embodiments, this may create unique liquidity events across various digital resource exchange systems 208 leading to slightly different prices for various digital resources from exchange to exchange.

The advent of digital resource exchanges has created a gap in entity, specific financial institution entities, visibility into resource distributions to and from digital resource exchanges or block chains. In embodiments where a financial institution or entity is a party to a transaction with a digital resource exchange, the digital resource exchange itself may determine certain text to be included in the transaction description field of the transaction. As such, if the digital resource exchange does not self-identify as a digital resource exchange, then financial institution or entity will need to look to other sources of information to deduce whether or not the transaction type involves a digital resource exchange or digital resources themselves (e.g., transferring resources to a digital resource exchange for later trading, swapping, leveraging, or the like, or using resources to directly buy digital resources, virtual currencies, cryptocurrencies, tokens, nonfungible tokens, or the like). The gap created by this blindness puts financial institutions and other entities in the precarious situation of being unable to efficiently and accurately identify resource accounts involved in potential misappropriation activities. It is common for digital resource exchanges that are assisting or enabling malfeasant financial activities to avoid self-declaring as a digital resource exchange, but instead declare as an on-line retailer. Thus, financial institutions cannot even begin the first step of a potential malfeasant activity investigation.

It is understood that while not all digital resource exchanges or digital resource transactions are malfeasant, and indeed a large majority may be legitimate, lack of due diligence by some digital resource exchanges, such as failure to collect personal information when setting up accounts or wallets, failure to maintain records of transactions between wallets and users, or the like, creates an opportunity for users to leverage these failures in order to move resources for potentially malfeasant purposes, in some instances without leaving any meaningful or identifiable data footprint. In certain instances, the digital resources themselves, or their underlying distributed registers or decentralized block-chains, may be designed particularly to offer anonymity (e.g., "privacy coins," or the like). In instances where certain anonymized or privacy-centric digital resources are only accessible via a select few exchanges, those exchanges may act as popular off-ramps, on ramps, resource scramblers, or funnels for misappropriated resources. There is typically nothing that identifies the digital resource exchange as such across the payment flow. As such, a need exists to gather necessary information in order to rectify the information gap presented by lack of self-identification in transactions involving certain digital resource exchanges in order to provide a system that may leverage this data in a layered analysis of resource accounts to enhance the ability to perform pattern analysis and identify malfeasant activity. It is understood that embodiments of the invention may not focus solely on the identification of digital resource exchanges or digital resources as a determining factor or proximate cause of malfeasant activity, but given that certain malfeasant resource behavior often includes the use of digital resource exchanges, gathering such information allows financial institutions and entities to make more informed, precise decisions.

The system is utilized to identify and tag accounts and exchanges associated with potential digital misappropriation. As such, this may include the integral step of identifying the accounts supporting digital resource exchanges, and using this identified information to determine that one or more transactions involve a digital resource exchange as a party. As an initial step in identifying accounts supporting digital resource exchanges, the system may set up an account, such as a digital resource account or wallet on one or more exchanges. The system then funds the digital resource account or wallet with entity or financial institution funds, wherein the funding step is a resource transaction with the digital resource exchange. Once the transaction occurs with the exchange, the system may record, retrieve, or otherwise look up the resource distribution pathway or metadata associated with the transaction across one or more multiple resource transaction rails. In doing so, the system may identify a unique payment identifier, account number, routing number, wallet address, or the like, associated with the digital resource exchange, collectively referred to as digital resource exchange identifiers. The system tags the digital resource exchange identifiers with the name of the digital resource exchange, categorizes the tags in various ways based on resource transaction rail, exchange name, exchange location, or the like, and stores the tagged information to maintain an inventory of digital resource exchanges and the various identifiers of the exchanges. As such, the system may be utilized as intelligence source to identify accounts transacting with the digital resource exchanges so the resource accounts can be flagged for further review. In other embodiments, the identification of accounts transacting with the digital resource exchanges may be one of multiple weighted factors in determining if the account will be flagged for further review. In still further embodiments, the identification of the account transacting with the digital resource exchange may be weighted variably based on the volume, frequency, resource amount, or the like regarding transactions with the digital resource exchange. In some instances, an abrupt change in the volume frequency, resource amount, or the like with regard to transactions with one or more digital resource exchanges may cause the system to weight this factor more heavily. In other embodiments, certain digital resource exchange known to be involved with malfeasant resource transactions, known as failing to collect personal information, or the like, may cause the system to more heavily weight factors that include tags related to those certain digital resource exchanges.

FIG. 3 provides a high level process flow 100 illustrating an identification and categorization of digital resource identifiers, in accordance with one embodiment of the present invention. As illustrated in block 102, the process 100 is initiated by identifying one or more resource exchanges of interest. These digital resource exchanges may not be coded by the digital resource exchange mitigation system as an actual digital resource exchange. For example, while the entity or financial institution may know that the digital resource exchange exists and may suspect that some transactions from or to entity accounts involve the digital resource exchange as a recipient or sender, the entity or financial institution may not have the necessary digital resource exchange identifiers in order to tag or categorize those transactions. As such, the invention provides a process to identify digital resource exchange identifier data associated with the digital resource exchange for every possible resource distribution channel. When the exchange does not include necessary, detailed, or accurate payment identifier information, the financial institution that maintains an account which transacts with the digital resource exchange does not typically have visibility to recognize the transaction is being performed with the digital resource exchange. In some embodiments, maintaining accounts that transact on or with the digital resource exchange may lead to issues for the financial institution.

In some embodiments, the digital resource exchange(s) may be identified by machine learning algorithms, manually, or the like. In this way, the system may identify possible exchanges based on identification of transactions that follow historic trends associated with digital resource exchange transactions. For instance, the machine learning algorithm of the system may compare exchange prices of various digital resources, denominated in fiat resources, at the time of one or more transactions in order to deduce a pattern of recurring buys of certain increments of digital resources. Furthermore, the system may search the internet or a third party database for digital resource exchange identifiers, a user may input potential digital resource exchanges known to users, or the like.

Next, as illustrated in block 104, the process 100 continues by the system creating one or more digital resource accounts or wallets on the digital resource exchange(s). In this way, the system may set up a digital resource account or wallet with the digital resource exchange as a customer would, and fund the account or wallet for each of the possible funding methods or payment channels, such as wire, ACH, digital resource transfer, or the like, that are accepted by the digital resource exchange. The digital resource account may be controlled by the system, such that the system may maintain the transactions using the digital resource account on the digital resource exchange. In some embodiments, this process may be automated by the system such that a bot is programmed to input required information for creation of the account or wallet, while in other embodiments, the creation of a digital resource account or wallet may require a human user to initially create the account or wallet. During creation of the account or wallet, the system will log or snapshot data entry fields in order to catalog the required information for creating the account or wallet, such as "know-your-customer" information including name, address, geographic location, or the like. In some embodiments, the system may make note of certain fields which are expected in account or wallet creation but appear to be lacking. In some embodiments, the system may be able to extract text directly from a web-form, HTML, or other like interface, whereas in other embodiments the system may be required to take screenshots of the interface and perform optical character recognition in order to identify key words, fields, or the like either through direct keyword matching, contextual machine learning analysis of language syntax, or the like.

As illustrated in block 106, the process 100 continues by funding/reversing the funding of the digital resource account with entity resources for the digital resource exchange for each of the payment channels. In this way, the wallet may be funded with resources for performing transactions on or across the digital resource exchange using various payment channels. The system may then transmit resources across the digital resource exchange to complete a transaction on the digital resource exchange via one or more of the payment channels. Once the transaction across the digital resource exchange has been processed, using the backend networking of the financial institution associated with the system, the system may be able to identify the unique payment information of the transaction across the digital resource exchange and store this information as digital resource exchange identifier data. Furthermore, the system, using the same backend financial institution server may be able to identify an account, merchant code, wallet, or the like associated with the digital resource exchange.

In some embodiments, funding the entity controlled presence on the digital resource exchange further comprises funding the presence with resources from an account associated with the entity, wherein the funding occurs for each payment channel. In some embodiments, reversing the funding from the entity controlled presence on the digital resource exchange further comprises reversing the funding to the account associated with the entity for each payment channel.

As illustrated in block 110, the system may identify the information associated with the transaction across the digital resource exchange. In this way, in order to complete a transaction, the digital resource exchange may provide information associated with the digital resource exchange to the financial institution to process the transaction. As such, the system may be able to identify information about the digital resource exchange and if the digital resource exchange is an exchange. As further shown in block 112, the system may scrape or gather additional digital resource exchange data from the exchange, account, or wallet interface. For instance, the exchange interface may include certain products, resources, services, or the like (e.g., trading, swapping, leveraging, staking, or the like) for various digital resources. The system may identify these offerings and compatible digital resources of the digital resource exchange and store this information as further digital resource exchange identifier data.

Next, as illustrated in block 114, the process 100 continues by storing the information in the memory of the digital resource exchange mitigation platform as digital resource exchange identifier information for later rule implementation and transaction tagging. Unique datastores may be created for each digital resource exchange identified, interacted with, or for which data was gathered or received, wherein the system may store digital resource exchange identifier information in each respective datastore. Digital resource exchange identifiers may be cross-referenced, compared, and categorized. In this way, the system may store the information, and upon processing of any transaction, the system may use this digital resource exchange identifier information in order to tag transactions as involving one or more known digital resource exchanges. Certain digital resource exchanges may be categorized in any number of ways with regard to the services they offer, the digital resources they support, the information they collect, the perceived liquidity of the exchange, or the like.

In some embodiments, the system may identify, based on back end tracking, account information for the account supporting the exchange. In this way, once the transaction occurs across the exchange, the system may be able to identify the account that the digital resource account transmitted funds to. In this way, the system may be able to identify one or more portions of an account number, account owner, or other account information about the account associated with the other side of the transaction across the digital resource exchange. The account may be tagged for rule implementation or to institute further review, monitoring, or in some cases, to freeze the account or prevent other accounts within the financial institution from transacting with known accounts associated with digital resource exchanges, as these accounts may be associated with malfeasant transactions. For example, in some instances, the financial institution may receive instructions from a payment provider that funds are to be used for specific purposes only, and those specific purposes may not include investment in or purchasing of any digital resources, such as cryptocurrency. For example, corporate expense accounts, unemployment benefits, education loan accounts, or the like may be restricted for specific purposes and specific types or categories of goods, services, merchants, or entities. In these instances, transactions from restricted accounts to digital resource exchanges may be automatically restricted, blocked, reversed, frozen, or the like. In other instances, regardless of whether an account is or is not restricted for specific purposes, recognition of account activity or attempted transactions which involve one or more digital exchanges may prompt the system to automatically freeze or lock the resource account in its entirety. In other words, not only will the system freeze or pause initiated or attempted transactions, but the system may freeze or lock the account from any further access or activity until further review or investigation can be completed. This may include automatically freezing the resource account and forwarding a message, alert, report, or the like, containing pertinent transaction, account, or digital resource exchange information to an administrator or review team for further review and investigation.

FIG. 4 provides a high level process flow 600 illustrating an identification and tagging of transactions with a digital resource exchange, in accordance with one embodiment of the present invention. As illustrated in block 602, the process 600 is initiated by retrieving or recording transaction data for one or more entity user resource account. In some embodiments, the system may access a database of transaction information that the entity collects and stores for user resource accounts at the entity. In other embodiments, the system may monitor transactions occurring in real-time via one or more transaction channels in order to record necessary transaction data. In embodiments where the system records transaction data in real time for multiple transaction channels, the transaction channels may already be categorized for the transaction data. In instances where the system is retrieving stored data, the system may analyze transaction metadata to identify the channel used for each resource transaction, as shown in block 604.

Next, as illustrated in block 606, based on the identified channel of each resource transaction, the system may retrieve digital resource exchange identifiers for the identified channel. For instance, if a specific transaction involved an ACH transfer of resources from the entity user account, the system would retrieve the digital resource exchange identifiers for ACH payments (e.g., destination account number, routing number, or the like for all identified digital resource exchanges). Once this data is retrieved, the system may perform a cross-reference between the channel-specific digital resource exchange identifiers and the specific transaction being analyzed, as shown in block 610. In this way, the system may determine, on a transaction by transaction basis, which of those resource transactions involved one or more digital resource exchanges as a party to the transaction.

Next, the system may identify a match between transaction metadata and retrieved digital resource exchange identifiers, and may tag the transaction with a digital resource exchange tag, as shown in block 612. In this way, transactions may be categorized based on the nature of their including one or more digital resource exchanges as a party to the transaction. These tagged transactions may be stored by the system for further review, as shown in block 614. As noted, the general tagging of transactions as involving payments to or from digital resource exchanges may not warrant action from the entity or financial institution in every case; however, such information may be valuable in identifying potential malfeasant transactions that are which may be identifiable based on a confluence of factors, one of which is the digital resource exchange tag. It is understood that the tag may not be binary in all embodiments, but instead may contain a weighted value for use in later malfeasant transaction analysis. For instance, the digital resource exchange tag for certain digital resource exchanges may be weighted more heavily than others based on known issues or previous loss associated with particular digital resource exchanges (e.g., the digital resource exchange does not collect requisite information from customers to align with industry best practices, the digital resource exchange provides the ability for users to anonymize or scramble resources, the digital resource exchange typically holds resources for a concerning amount of time before they are available to be transacted, or the like).

FIG. 5 provides a high level process flow 900 illustrating action steps in response to analysis of tagged transactions, in accordance with one embodiment of the present invention. As illustrated, the electronic exchange visibility platform 902 provides visualization into flagged accounts 904, flagged exchanges 908, flagged wallets 906, and tagged transactions 910.

In some embodiments, flagged accounts 904 may include any accounts identified by the system that may be involved in transactions associated with digital resource exchanges. In other embodiments, entity resource accounts may be flagged for a number of other reasons, such as various restrictions placed on corporate accounts, publicly funded accounts, accounts controlled by one or more users but benefiting one or more other others as authorized parties, or the like. As such, these transaction and accounts may be non-compliant with existing rules or restrictions in place for the accounts from the simple nature of their interacting with or transacting with one or more digital resource exchanges. For instance, in some embodiments, the system may flag one or more resource accounts as restricted corporate accounts only to be used for specific business-related purposes, not including buying/selling/transacting of digital resources. In other embodiments, one or more resource accounts may be flagged as restricted based on a parent or guardian as a guarantor of the account, wherein the parent or guardian places a restriction on a dependent's account to be used only for specific purposes, not includes the buying/selling/transacting of digital resources. In further embodiments, a resource account may be flagged as receiving resources from a municipality providing aid or assistance such as an unemployment benefit, wherein the benefit is restricted such that it should not be used for buying/selling/transacting digital resources. In other embodiments, resource accounts may be flagged for other reasons, such as a new user or user device accessing the account which is out of the ordinary (e.g., the system recognizes that a user has logged in to an account portal from an unrecognized IP address, device ID, location, or the like), which places the account at a higher statistical probability of perhaps being compromised or later used for malfeasant transactions. In other instances, regardless of whether an account is or is not flagged or restricted for specific purposes, recognition of account activity or attempted transactions which involve one or more digital exchanges may prompt the system to automatically freeze or lock the resource account in its entirety.

In some embodiments flagged exchanges 908 may include any exchanges that may be associated with non-compliant transactions or services. As previously noted, digital resource exchange identifiers may be cross-referenced, compared, and categorized. Certain digital resource exchanges may be categorized in any number of ways with regard to the services they offer, the digital resources they support, the information they collect, the perceived liquidity of the exchange, or the like. In some embodiments, if a particular digital resource exchange is known to be, or determined by the system to be, non-compliant with entity rules, industry best practices, or other entity preferences, these exchanges may be flagged by the system as flagged exchanges 908. In some embodiments, flagged wallets 906 may similarly be flagged just as exchanges are, and may include any wallets associated with non-compliant transactions. For example, in certain instances, the transaction channel of a particular transaction may not specifically identify a particular digital resource exchange, but may be known to interact with one or more digital resource exchanges. In some embodiments the flagged wallet 906 may be a known digital resource wallet previously used by a malfeasant actor in order to send digital resource from one or more entity accounts to a digital resource exchange. The system may flag these particular wallets as flagged wallets 906 and block transactions from entity accounts to these wallets.

As previously discussed with respect to FIG. 4, tagged transactions 910 may include transactions which have been appended with a tag indicating that the transactions involved a digital resource exchange as a party to the transaction. In some instances, the tagged transactions 910 may include tags with different weighting characteristics depending on if the digital resource exchanges identified as a party to the transactions are flagged exchanges 908 or not. In some embodiments, if an account is flagged for any reason, or is determined to have been accessed or attempted to be accessed in initiating or completing any tagged resource transactions (e.g., transactions involving one or more digital resource exchanges), the system may automatically freeze or lock the particular resource account from any further use until a review can be completed. In some embodiments, only certain flagged accounts may be restricted from interacting with digital resource exchanges. In other embodiments, all accounts may be automatically restricted from interacting with one or more digital resource exchanges, whether or not the accounts are flagged. In doing so, the system may proactively thwart the use of the resource account in any number of potentially malfeasant manners. For instance, if an unauthorized party attempts to use a compromised account to transfer funds to one or more digital resource exchanges unsuccessfully, the unauthorized party may attempt one or more other avenues to extract resources from the resource account (e.g., the unauthorized party may attempt an automated teller machine withdrawal, or the like). As such, it is beneficial to place an automated freeze or lock on the account until a further investigation into the unauthorized account access can take place. One of ordinary skill in the art will recognize that an automated and expedited response in these instances is crucial. For instance, in some embodiments, an unauthorized user or malfeasant user who accesses or attempts to access a resource account in order to withdraw resources to a digital resource exchange may recognize a failure to withdraw resources to one or more digital exchanges, and may choose an alternate withdrawal method as a result. As such, the system's ability to automate further account restrictions, such as freezing or locking the resource account until further investigation or review, is pivotal not only in identifying an attempted transaction with a flagged exchange or entity, such as a digital resource exchange, but also in proactively avoiding alternate methods of unauthorized access or withdrawal.

Next, as illustrated in block 912, the process 900 continues by allowing access to the platform data for the financial institution in order to allow for any financial institution system to deny and/or accept transactions based on the flagging of accounts, wallet, or exchanges, or tagging of transactions. The system may determine if a rule exists regarding a particular tagged transaction 910, flagged account 904, flagged exchange 908, flagged wallet 906, or the like, as shown in block 914. Finally, as illustrated in block 916, the process 900 is finalized by preforming a decision processing across the entity for each account, wallet, exchange, or the like. As such the decision provides for the financial institution system to determine the approval or denial of transactions being performed by the account, exchange, wallet, or the like.

The system is utilized to identify and flag accounts and exchanges associated with potential digital resource misappropriation or otherwise malfeasant or unauthorized behavior. As such, identifying the accounts supporting digital resource exchanges. The system sets up an account, such as a digital resource account or wallet on that exchange. The system funds and reverses the funding of the digital resource account with entity or financial institution funds. Once a transaction occurs via the digital resource exchange, the system collects, analyzes, and categorizes the digital resource exchange identifiers. Doing so, the system may identify the resource account or other unique criteria associated with the digital resource exchange. The system tags resource transactions if they are identified, based on transaction channel and metadata, to include one or more digital resource exchanges as a party. The system is also utilized as an intelligence source to flag accounts, wallets, and exchanges transacting with financial institution or entity accounts which may be subject to rules or restrictions regarding buying/selling/transacting digital resources in general.

Embodiments of the invention are directed to a system, method, or computer program product for digital resource exchange visibility. The system identifies information associated with activities on potential digital resource exchanges. The system identifies potential digital resource exchanges and introduces an entity controlled account for funding and reversing funding on a digital resource exchange. The account may be translated to the exchange as a realistic account utilizing the various payment channels for interaction with the digital resource exchange. Once an interaction occurs via the exchange, the system may be able to perform back end searching for data extraction about the interaction. The system is utilized as intelligence to flag interactions.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with the in authorization and instant integration of a new credit card to digital wallets.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for the authorization and instant integration of credit cards to a digital wallet, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for digital resource exchange mitigation, the system comprising:
    a memory device with computer-readable program code stored thereon;
    a communication device;
    a processing device operatively coupled to the memory device and the communication device, wherein the processing device is configured to execute the computer-readable program code to:
    identify a digital resource exchange;
    access an onboarding platform of the digital resource exchange and create an entity controlled presence on the digital resource exchange, wherein the entity controlled presence includes a digital resource account or digital resource wallet;
    log data entry fields during creation of the entity controlled presence and store the required information for creating the entity controlled presence;
    fund the entity controlled presence on the digital resource exchange with resources from an account associated with the entity, wherein the funding occurs for one or more available payment channels offered by the digital resource exchange, and wherein the resources comprise traditional resources transacted over ACH, wire, real-time payment, or debit channels;
    reverse the funding from the entity controlled presence on the digital resource exchange to the account associated with the entity for each of the one or more available transaction channels;
    extract, via an entity-based backend processor, information about the digital resource exchange based on the funding and reversing performed, the required information for creating the entity controlled presence, and one or more services or digital resources supported by the digital resource exchange;
    store extracted information as one or more digital resource exchange identifiers;
    receive transaction data and transaction metadata for one or more entity user resource accounts, wherein the resources accounts contain the resources;
    cross reference the transaction data or transaction metadata collected via the ACH, wire, real-time payment, or debit channels with the digital resource exchange identifiers;
    based on a match between the transaction data or transaction metadata and the digital resource exchange identifiers, tag the one or more entity user resource accounts or specific transactions of the one or more entity user resource accounts as transacting with the digital resource exchange; and
    based on tagged entity user resource accounts or tagged specific transactions, initiate a decisioning step for transactions between the one or more entity user resource accounts and the digital resource exchange.

2. The system of claim 1, wherein the decisioning step further comprises declining, holding, or accepting transactions between the one or more entity user resource accounts and the digital resource exchange.

3. The system of claim 1, further configured to identify an entity resource account type of the one or more entity user resource accounts, wherein the entity resource account type includes one or more transaction restrictions.

4. The system of claim 1, wherein the digital resource exchange is a cryptocurrency or virtual currency exchange.

5. The system of claim 1, wherein the digital resource exchange identifiers further comprise one or more account numbers, wallet addresses, geographic locations, or transaction details.

6. The system of claim 1, further configured to weight digital resource exchange identifiers based on digital resources supported by the digital resource exchange or information collected by the digital resource exchange during an onboarding process.

7. The system of claim 1, further configured to:
    flag one or more accounts, wallets, or exchanges based on entity-based or customer based restrictions; and automatically block one or more tagged transactions associated with the one or more accounts, wallets, or exchanges, or automatically freeze or lock the one or more accounts from any further access or resource transaction activity.

8. A computer program product for digital resource exchange mitigation, the computer program product comprising at least one non-transitory computer-readable medium having computer-readable program code portions embodied therein, the computer-readable program code portions comprising:

an executable portion configured for identifying a digital resource exchange;

an executable portion configured for accessing an onboarding platform of the digital resource exchange and create an entity controlled presence on the digital resource exchange, wherein the entity controlled presence includes a digital resource account or digital resource wallet;

an executable portion configured for logging data entry fields during creation of the entity controlled presence and store the required information for creating the entity controlled presence;

an executable portion configured for funding the entity controlled presence on the digital resource exchange with resources from an account associated with the entity, wherein the funding occurs for one or more available payment channels offered by the digital resource exchange, and wherein the resources comprise traditional resources transacted over ACH, wire, real-time payment, or debit channels;

an executable portion configured for reversing the funding from the entity controlled presence on the digital resource exchange to the account associated with the entity for each of the one or more available transaction channels;

an executable portion configured for extracting, via an entity-based backend processor, information about the digital resource exchange based on the funding and reversing performed, the required information for creating the entity controlled presence, and one or more services or digital resources supported by the digital resource exchange;

an executable portion configured for storing extracted information as one or more digital resource exchange identifiers;

an executable portion configured for receiving transaction data and transaction metadata for one or more entity user resource accounts, wherein the resources accounts contain the resources;

an executable portion configured for cross referencing the transaction data or transaction metadata with the digital resource exchange identifiers collected via the ACH, wire, real-time payment, or debit channels;

an executable portion configured for, based on a match between the transaction data or transaction metadata and the digital resource exchange identifiers, tagging the one or more entity user resource accounts or specific transactions of the one or more entity user resource accounts as transacting with the digital resource exchange; and an executable portion configured for, based on tagged entity user resource accounts or tagged specific transactions, initiating a decisioning step for transactions between the one or more entity user resource accounts and the digital resource exchange.

9. The computer program product of claim 8, wherein the decisioning step further comprises declining, holding, or accepting transactions between the one or more entity user resource accounts and the digital resource exchange.

10. The computer program product of claim 8, further comprising an executable portion configured for identifying an entity resource account type of the one or more entity user resource accounts, wherein the entity resource account type includes one or more transaction restrictions.

11. The computer program product of claim 8, wherein the digital resource exchange is a cryptocurrency or virtual currency exchange.

12. The computer program product of claim 8, wherein the digital resource exchange identifiers further comprise one or more account numbers, wallet addresses, geographic locations, or transaction details.

13. The computer program product of claim 8, further comprising an executable portion configured for weighting digital resource exchange identifiers based on digital resources supported by the digital resource exchange or information collected by the digital resource exchange during an onboarding process.

14. The computer program product of claim 8, further comprising an executable portion configured for:

flagging one or more accounts, wallets, or exchanges based on entity-based or customer based restrictions; and automatically blocking one or more tagged transactions associated with the one or more accounts, wallets, or exchanges, or automatically freeze or lock the one or more accounts from any further access or resource transaction activity.

15. A computer-implemented method for digital resource exchange mitigation, the method comprising:

providing a computing system comprising a computer processing device and a non-transitory computer readable medium, where the computer readable medium comprises configured computer program instruction code, such that when said instruction code is operated by said computer processing device, said computer processing device performs the following operations:

identifying a digital resource exchange;

accessing an onboarding platform of the digital resource exchange and create an entity controlled presence on the digital resource exchange, wherein the entity controlled presence includes a digital resource account or digital resource wallet;

logging data entry fields during creation of the entity controlled presence and store the required information for creating the entity controlled presence;

funding the entity controlled presence on the digital resource exchange with resources from an account associated with the entity, wherein the funding occurs for one or more available payment channels offered by the digital resource exchange, and wherein the resources comprise traditional resources transacted over ACH, wire, real-time payment, or debit channels;

reversing the funding from the entity controlled presence on the digital resource exchange to the account associated with the entity for each of the one or more available transaction channels;

extracting, via an entity-based backend processor, information about the digital resource exchange based on the funding and reversing performed, the required information for creating the entity controlled presence, and one or more services or digital resources supported by the digital resource exchange;

storing extracted information as one or more digital resource exchange identifiers;

for receiving transaction data and transaction metadata for one or more entity user resource accounts, wherein the resources accounts contain the resources;

cross referencing the transaction data or transaction metadata with the digital resource exchange identifiers collected via the ACH, wire, real-time payment, or debit channels;

based on a match between the transaction data or transaction metadata and the digital resource exchange identifiers, tagging the one or more entity user resource accounts or specific transactions of the one or more entity user resource accounts as transacting with the digital resource exchange; and based on tagged entity user resource accounts or tagged specific transactions, initiating a decisioning step for transactions between the one or more entity user resource accounts and the digital resource exchange.

16. The computer-implemented method of claim 15, wherein the decisioning step further comprises declining, holding, or accepting transactions between the one or more entity user resource accounts and the digital resource exchange.

17. The computer-implemented method of claim 15, further comprising identifying an entity resource account type of the one or more entity user resource accounts, wherein the entity resource account type includes one or more transaction restrictions.

18. The computer-implemented method of claim 15, wherein the digital resource exchange identifiers further comprise one or more account numbers, wallet addresses, geographic locations, or transaction details.

19. The computer-implemented method of claim 15, further comprising weighting digital resource exchange identifiers based on digital resources supported by the digital resource exchange or information collected by the digital resource exchange during an onboarding process.

20. The computer-implemented method of claim 15, further comprising:

flagging one or more accounts, wallets, or exchanges based on entity-based or customer based restrictions; and automatically blocking one or more tagged transactions associated with the one or more accounts, wallets, or exchanges, or automatically freeze or lock the one or more accounts from any further access or resource transaction activity.

\* \* \* \* \*